United States Patent
Reed et al.

(10) Patent No.: US 10,761,943 B2
(45) Date of Patent: Sep. 1, 2020

(54) MULTI-SECTION FULL VOLUME BACKUPS

(71) Applicant: International Business Machines Corporation, Armonk, NY (US)

(72) Inventors: David C. Reed, Tucson, AZ (US); Esteban Rios, Tucson, AZ (US); Max D. Smith, Tucson, AZ (US); Gregory E. McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 16/041,775

(22) Filed: Jul. 21, 2018

(65) Prior Publication Data

US 2020/0026610 A1 Jan. 23, 2020

(51) Int. Cl.
*G06F 11/14* (2006.01)
*G06F 11/34* (2006.01)

(52) U.S. Cl.
CPC ...... *G06F 11/1451* (2013.01); *G06F 11/1464* (2013.01); *G06F 11/1469* (2013.01); *G06F 11/3442* (2013.01)

(58) Field of Classification Search
CPC ............ G06F 11/1451; G06F 11/1464; G06F 11/1469; G06F 11/3442
See application file for complete search history.

(56) References Cited

U.S. PATENT DOCUMENTS

| | | | |
|---|---|---|---|
| 5,724,500 A | 3/1998 | Shinmura et al. | |
| 6,505,216 B1 | 1/2003 | Schutzman et al. | |
| 7,092,976 B2 | 8/2006 | Curran et al. | |
| 7,574,461 B1* | 8/2009 | Armorer | G06F 11/1458 |
| 8,244,998 B1* | 8/2012 | Krinke, II | G06F 11/1464 711/161 |
| 9,165,001 B1* | 10/2015 | Upadhyay | G06F 11/1453 |
| 9,183,268 B2 | 11/2015 | Novick et al. | |
| 9,323,759 B1* | 4/2016 | Varrin | G06F 16/113 |

(Continued)

FOREIGN PATENT DOCUMENTS

GB 2514569 A 12/2014

OTHER PUBLICATIONS

Bhagwat, Deepavali, et al., "Extreme Binning: Scalable, Parallel Deduplication for Chunk-based File Backup," Modeling, Analysis & Simulation of Computer and Telecommunication Systems, 2009 IEEE International Symposium, Jul. 6, 2009.

*Primary Examiner* — Ryan Bertram
(74) *Attorney, Agent, or Firm* — Nelson and Nelson; Daniel P. Nelson; Alexis V. Nelson

(57) ABSTRACT

A method for backing up data is disclosed. In one embodiment, such a method includes identifying a volume of data to back up, and determining a number of backup tasks that can operate in parallel to back up data in the volume. The number of backup tasks may be based on an amount of memory available, a fragmentation level of a target storage area, a number of tape mounts that are available, or the like. The method then divides the volume into a number of sections corresponding to the number of backup tasks. Each section is associated with a particular backup task. The method then initiates the backup tasks to back up their corresponding sections in parallel. In certain embodiments, each backup task generates a data set storing backup data from its corresponding section. A corresponding system and computer program product are also disclosed.

20 Claims, 6 Drawing Sheets

(56) References Cited

U.S. PATENT DOCUMENTS

| | | |
|---|---|---|
| 9,785,642 B2 | 10/2017 | Kishi et al. |
| 2012/0054459 A1* | 3/2012 | Belisle .................... G06F 3/061 |
| | | 711/163 |
| 2013/0290265 A1* | 10/2013 | Hari .................... G06F 11/1461 |
| | | 707/654 |

* cited by examiner

MULTI-SECTION FULL VOLUME BACKUPS

BACKGROUND

Field of the Invention

This invention relates to systems and methods for backing up data.

Background of the Invention

Data is often one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring.

One method for preventing data loss is to periodically back up data to another location. Today, when a disk volume is backed up, one task is typically scheduled to copy a range of tracks on the volume to a single backup file. As volumes both logical and physical expand in size, the size of the backup file also expands and this in turn increases the amount of time needed to back up the volume. This also increases the amount of time that data may be locked and unavailable during the backup operation. The larger backup file also undesirably lengthens the amount of time needed to restore the data, which in turn may increase the amount of time needed to get an application back up and running after a failure. As the size of a backup file increases, it can also be difficult to find and allocate enough storage space to store the backup file. Thus, the expanding size of backup files may create a whole host of additional issues.

In view of the foregoing, what are needed are systems and methods to more efficiently back up data, particularly large volumes of data. Ideally, such systems and methods will reduce the amount of time needed to back up and restore data. Yet further needed are systems and methods to more efficiently allocate storage space for backing up large amounts of data.

SUMMARY

The invention has been developed in response to the present state of the art and, in particular, in response to the problems and needs in the art that have not yet been fully solved by currently available systems and methods. Accordingly, systems and methods have been developed to more efficiently back up large amounts of data. The features and advantages of the invention will become more fully apparent from the following description and appended claims, or may be learned by practice of the invention as set forth hereinafter.

Consistent with the foregoing, a method for backing up data is disclosed. In one embodiment, such a method includes identifying a volume of data to back up, and determining a number of backup tasks that can operate in parallel to back up data in the volume. The number of backup tasks may be based on an amount of memory available, a fragmentation level of a target storage area, a number of tape mounts that are available, or the like. The method then divides the volume into a number of sections corresponding to the number of backup tasks. Each section is associated with a particular backup task. The method then initiates the backup tasks to back up their corresponding sections in parallel. In certain embodiments, each backup task generates a data set storing backup data from its corresponding section.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
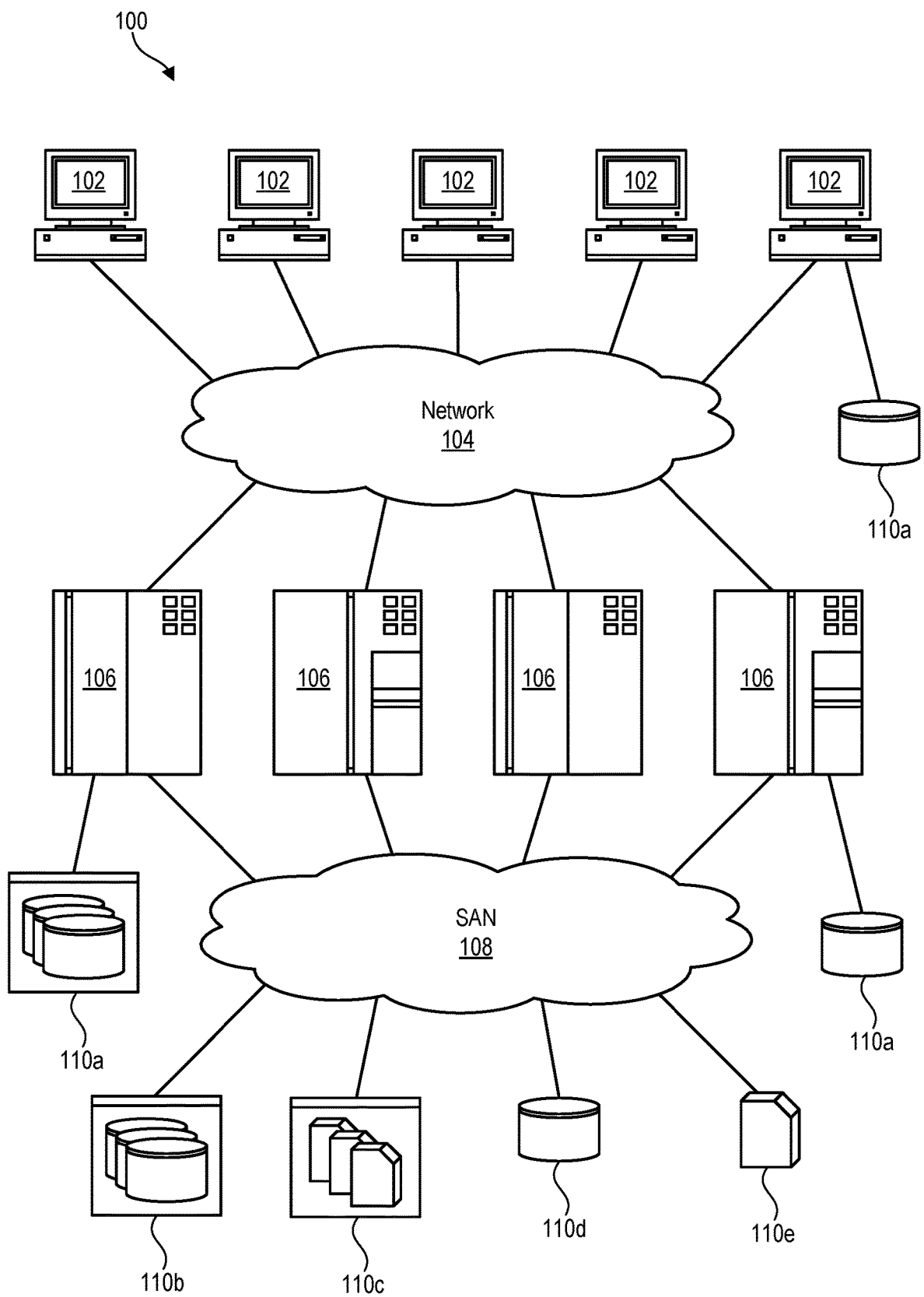
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
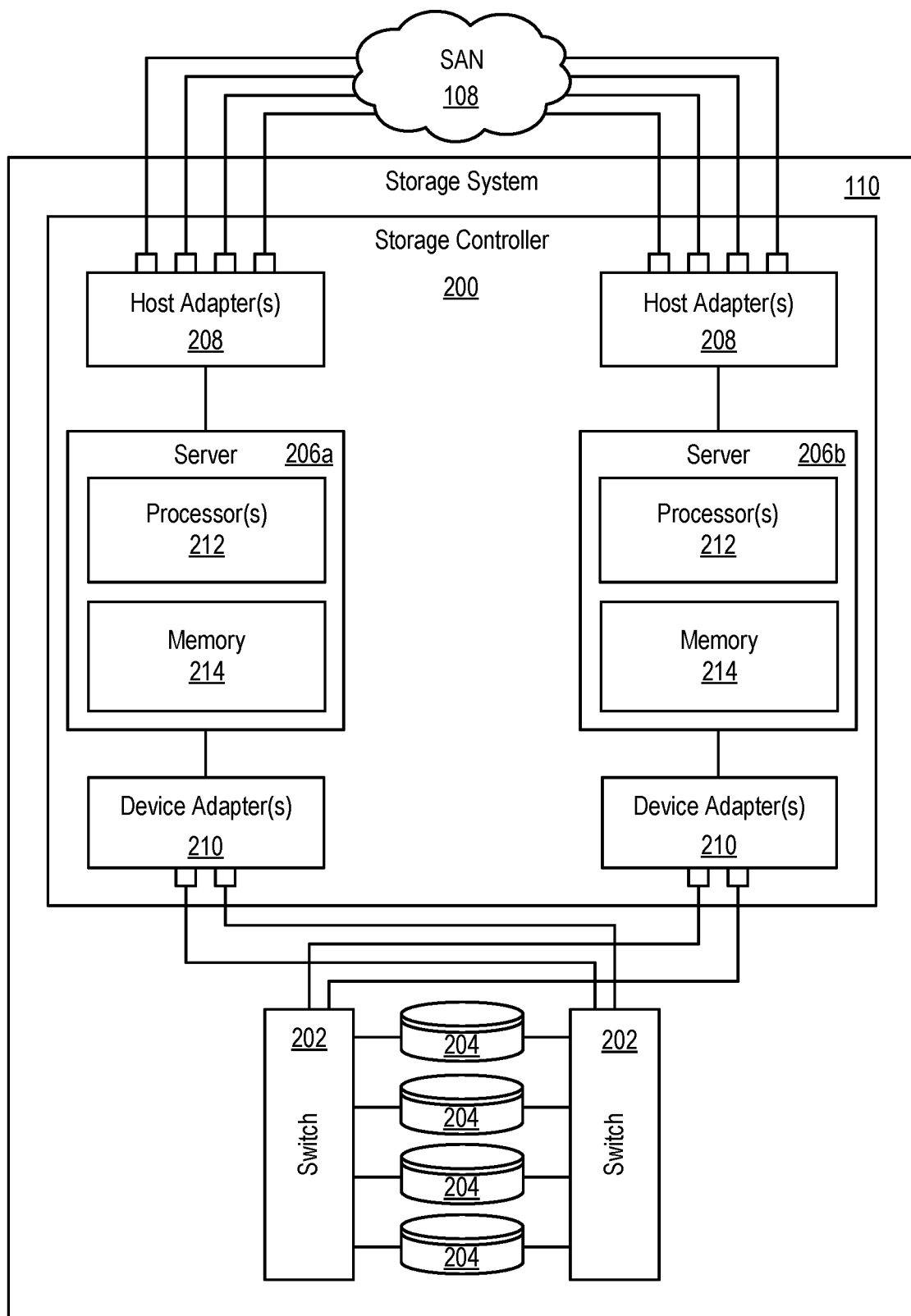
FIG. 2 is a high-level block diagram showing one example of a storage system in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
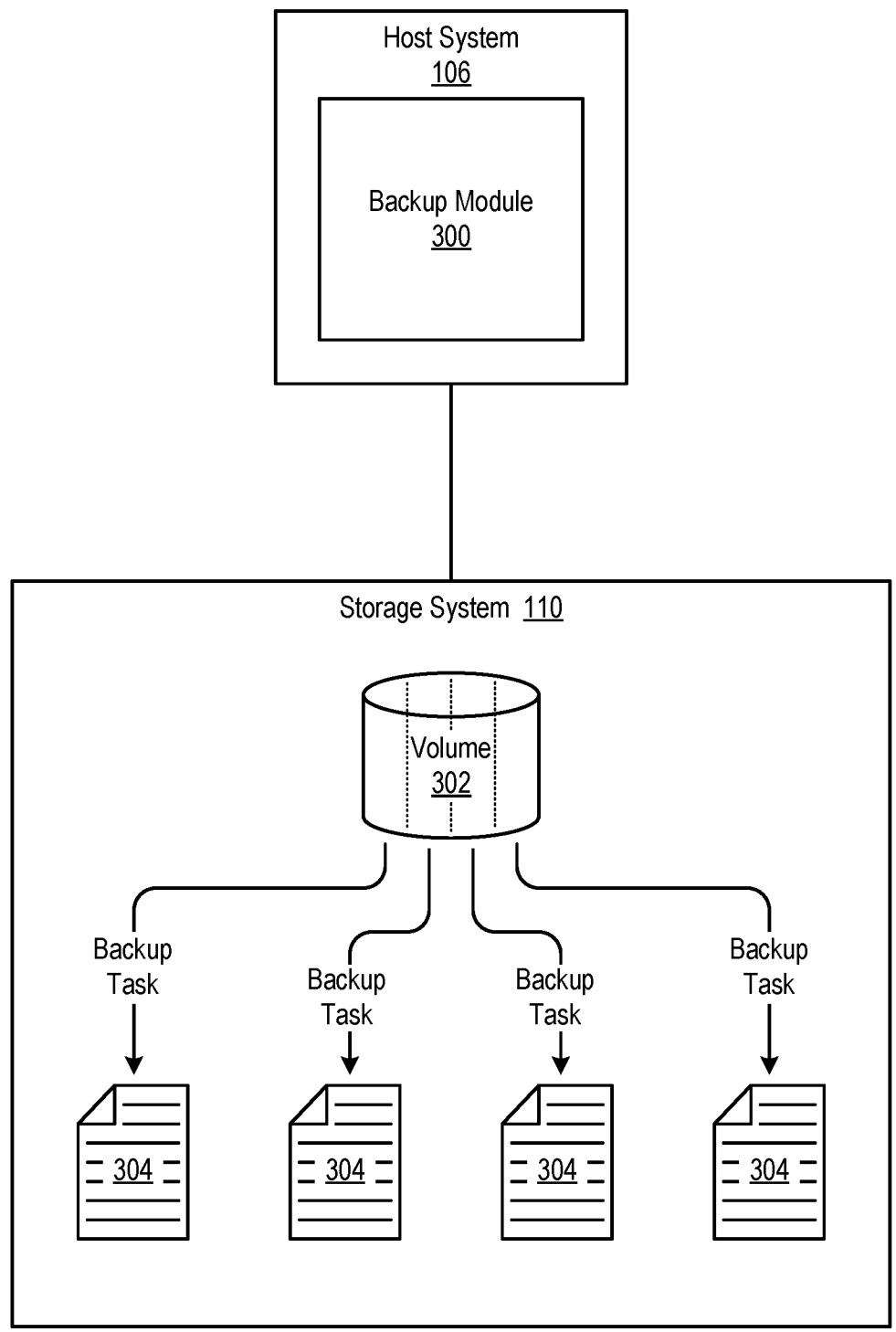
FIG. 3 is a high-level block diagram showing an improved technique for backing up data in a volume.

Referring to FIG. 3, as previously mentioned, one method for protecting data in a storage system 110 such as that illustrated in FIG. 2 is to periodically back up the data. Such a backup may occur on the same storage system 110 in which the data is stored (such as on other storage drives 204 of the storage system 110), or on a different local or remote storage system 110.

Today, when a disk volume 302 is backed up, a single task may be scheduled to copy a range of tracks on the volume 302 to a single backup file. As volumes 302 both logical and physical continue to increase in size, the size of a backup file can become very large and it may take an increasing amount of time to back up the volume 302. This, in turn, may increase the amount of time that data may be locked and unavailable while the backup occurs. The larger backup file also undesirably increases the amount of time needed to restore the data, which in turn may increase the amount of time needed to get an application back up and running after a failure. As the size of a backup file expands, it can also be difficult to find and allocate enough storage space to store the backup file. Thus, larger backup files may create a whole host of additional issues.

In certain embodiments in accordance with the invention, a backup module 300 may be provided in a host system 106 to back up and restore volumes 302 in a faster and more efficient manner. Instead of dispatching a single backup task to back up data in a volume 302, the backup module 300 may dispatch multiple backup tasks in parallel. Each backup task may back up a different section of the volume 302. In certain embodiments, each backup task may store its backup data in a separate file 304 or data set 304. These files 304 or data sets 304 may, in certain embodiments, collectively form a backup set. Because multiple backup tasks are dispatched in parallel, the backup module 300 may complete the backup operation much faster and reduce the amount of time that a volume 302 is locked and unavailable.

In certain embodiments, the backup module 300 may dispatch a default number of backup tasks to back up data in a volume 302. However, because backup tasks may consume resources, such as system memory and storage, the backup module 300 may be configured to adjust the number backup tasks that are dispatched based on available resources. For example, the backup module 300 may, in certain embodiments, analyze system memory and reduce the number of backup tasks if memory is insufficient. If the backup data is written to disk, the backup module 300 may also be configured to analyze the amount of storage space available and, in certain embodiments, the level of fragmentation of the storage space to determine an optimal number of backup tasks. If fragmentation of the target storage area is high, a larger number of smaller data sets 304 may be advantageous since they may fit into the smaller storage areas that are available. In such cases, the backup module 300 may increase the number of backup tasks dedicated to backing up the volume 302 to correspond to the larger number of data sets 304.

If the volume 302 is being backed up to tape, a parameter may be established to specify a maximum number of backup tasks to copy data to tape. If not enough tape mounts are available to accommodate the designated number of backup tasks, this number may be reduced to correlate to the number of tape mounts that are available. This will ideally prevent backup tasks from being queued or having to wait for a tape mount, which may slow down the backup operation. Alternatively, if not enough tape mounts are available to accommodate the designated number of backup tasks, some backup tasks may wait for the next available tape mount.

Once the number of backup tasks is determined (whether by default, based on system resources, by user designation, by algorithm, or using other criteria such as the size of the volume 302), the volume 302 may be logically divided into sections corresponding to the number of backup tasks. Each section may be associated with a particular backup task. In certain embodiments, the sections are sized substantially equally so that the backup tasks complete their operations at substantially the same time. This is not necessary in all embodiments. In certain embodiments, the sections may be larger for larger volumes 302 (e.g., Extended Address Volumes (EAVs)) and smaller for smaller volumes 302 (e.g., non-EAV volumes 302).

Figure 4:
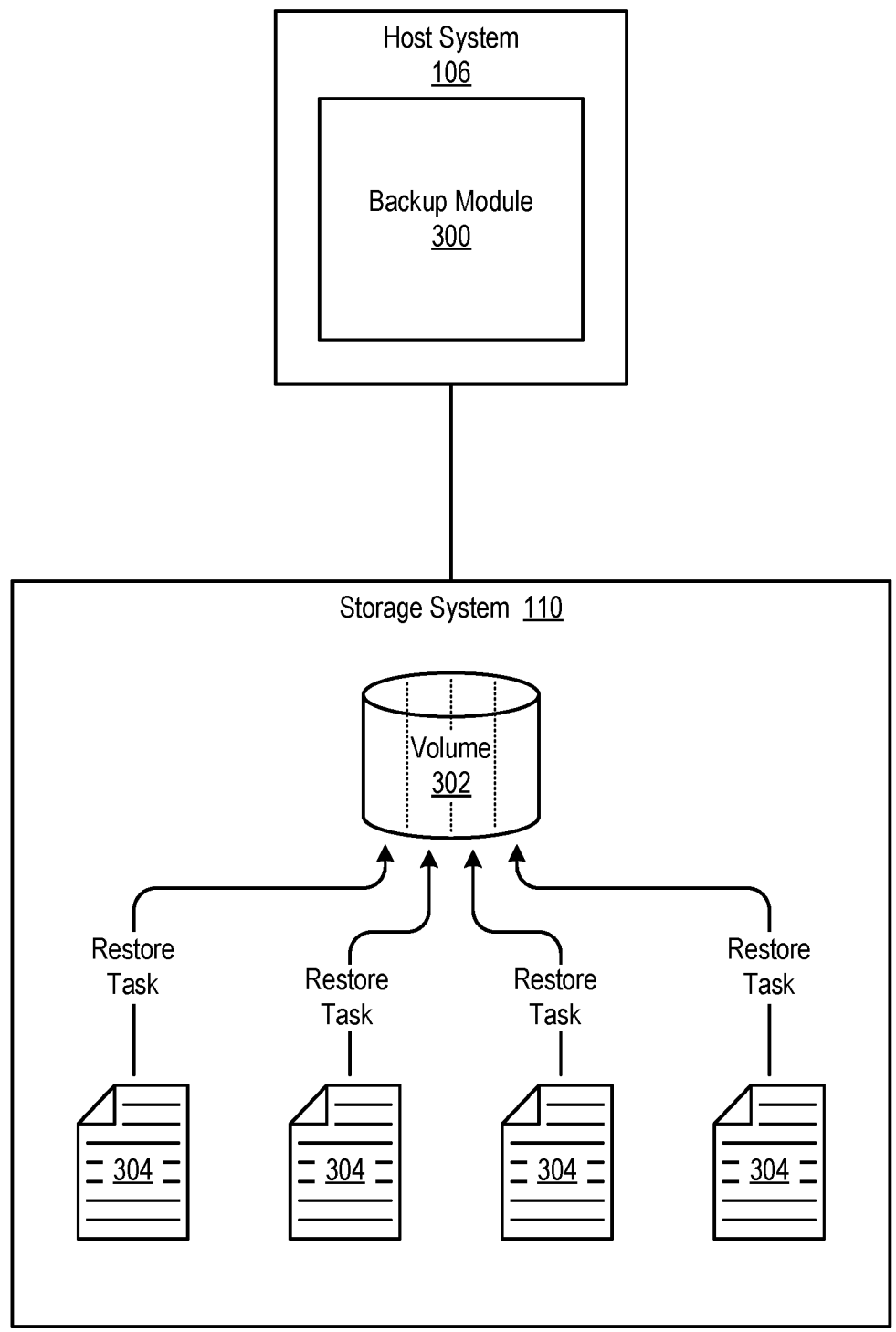
FIG. 4 is a high-level block diagram showing an improved technique for restoring data to a volume.

Referring to FIG. 4, when a volume 302 is restored from data in a backup set, the backup module 300 may dispatch restore tasks to restore data from the files 304 or data sets 304 to the volume 302. The number of restore tasks may, in certain embodiments, be equivalent to the number of files 304 or data sets 304 in the backup set. Dispatching several restore tasks to operate in parallel significantly decreases the amount of time needed to restore a volume 302, which in turn may decrease the amount of time needed to get an application back up and running after a failure.

Figure 5:
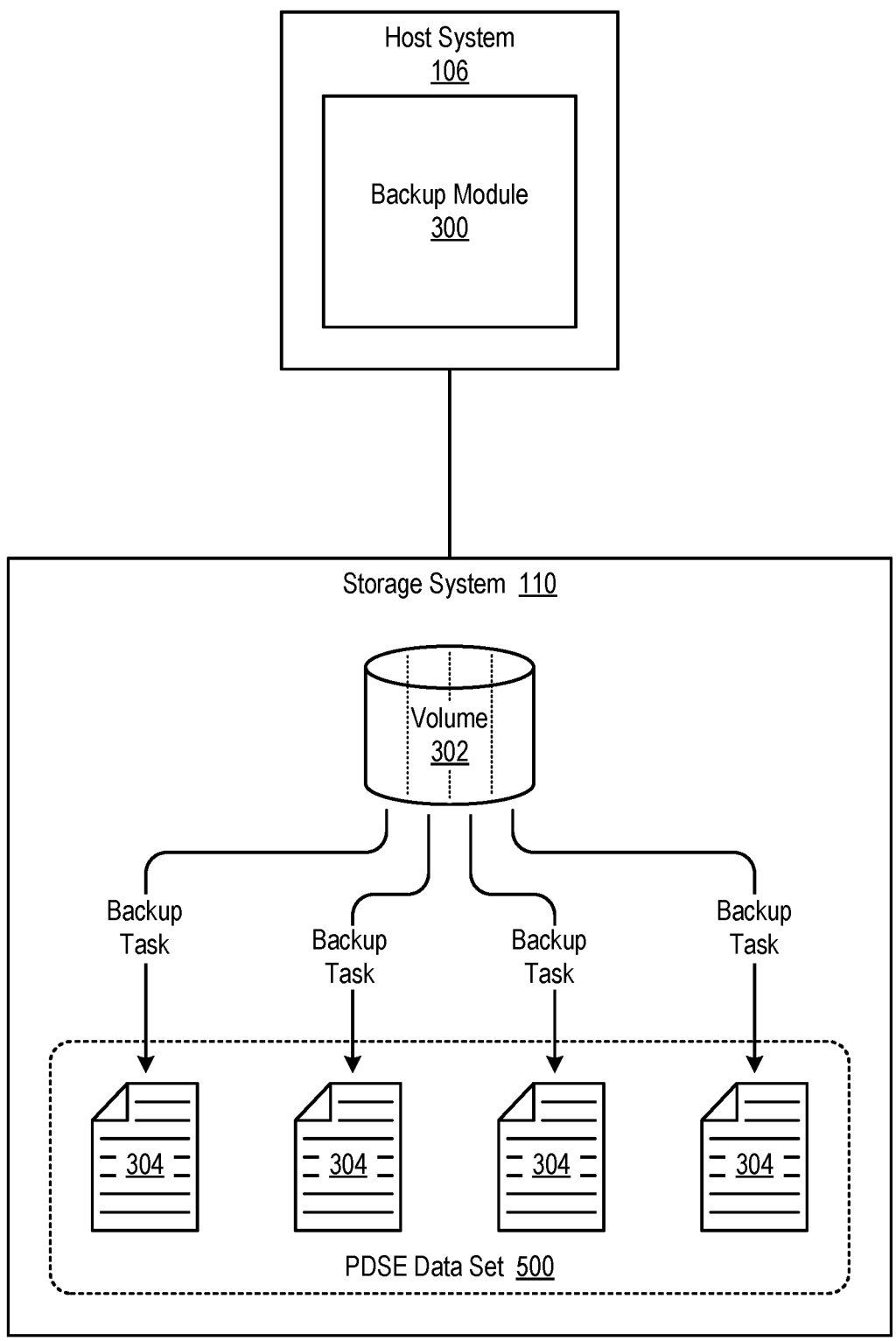
FIG. 5 is a high-level block diagram showing one exemplary data structure for associating data sets and/or members of a backup set.

Referring to FIG. 5, in certain embodiments in accordance with the invention, the data sets 304 generated by the backup tasks are associated with one another to create a backup set. In certain embodiments, each data set 304 may contain header information that associates it with the backup set and indicates what parts or tracks of the volume 302 the data set 304 contains. When a volume 302 is restored, the backup module 300 may use this header information to restore data to the volume 302 and assemble or direct the data to the correct locations within the volume 302.

In certain embodiments, the backup set is structured as a high-level data set or directory that encompasses each lower-level data set 304. In certain embodiments, the backup set is embodied as a PDSE (Partitioned Data Set Extended) data set 500, as shown in FIG. 5. As known to those of skill in the art, a PDSE data set 500 includes a directory and zero or more members. Each data set 304 may be structured as a member within the PDSE data set 500.

Figure 6:
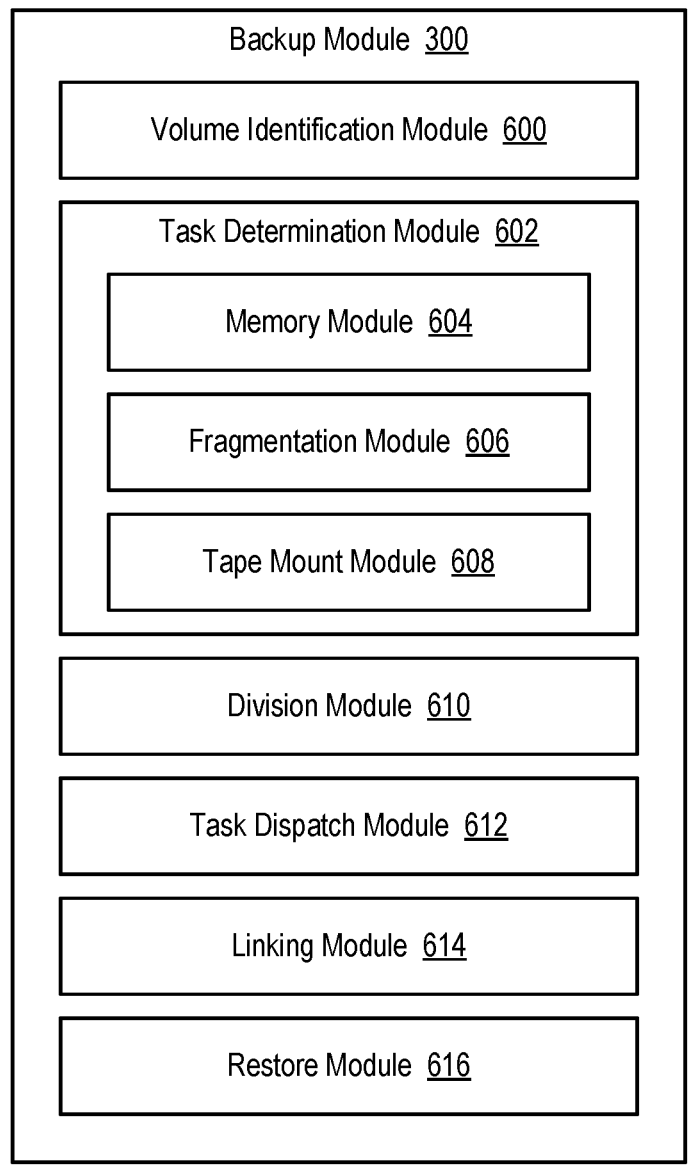
FIG. 6 is a high-level block diagram showing a backup module and associated sub-modules.

FIG. 6 is a high-level block diagram showing a backup module 300 and associated sub-modules. The backup module 300 and sub-modules may be implemented in hardware, software, firmware, or combinations thereof. The backup module 300 and sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the backup module 300 may include one or more of a volume identification module 600, task determination module 602, division module 610, task dispatch module 612, linking module 614, and restore module 616. The task determination module 602 may include one or more of a memory module 604, fragmentation module 606, and tape mount module 608. Each of the illustrated sub-modules may provide different features and functions.

As shown, the volume identification module 600 may identify a volume 302 to be backed up. Identifying a volume 302 may include identifying attributes of the volume 302, such as the size of the volume 302, that may be relevant to backing up the volume 302. Once a volume 302 is identified for back up, the task determination module 602 may determine a number of backup tasks to allocate to backing up the volume 302. As previously mentioned, in certain embodiments, the number of backup tasks is designated by default, by a user or administrator, or the number of backup tasks may be a function of the size or type of a volume 302 that is being backed up (e.g., whether the volume 302 is an EAV or non-EAV volume 302, for example).

In certain embodiments, the task determination module 602 uses various other sub-modules to determine a number of backup tasks to allocate to backing up a volume 302. For example, a memory module 604 may determine an amount of memory that is available to perform a backup process. If memory is insufficient, the task determination module 602 may reduce the number of backup tasks to utilize less memory.

Similarly, a fragmentation module 606 may determine a fragmentation level of a target storage area where the backup data is to be stored. If the fragmentation level is high and available storage areas are smaller, it may be advantageous to use smaller files 304 or data sets 304 to back up the volume 302. In such cases, the task determination module 602 may increase the number of backup tasks to produce more but smaller data sets 304 for storage in the smaller storage areas.

Similarly, if backup data is being stored on tape, the tape mount module 608 may determine a number of tape mounts that are available to receive the backup data. If not enough tape mounts are available to accommodate the number of backup tasks, the task determination module 602 may reduce the number of backup tasks to correspond to the number of tape mounts. In this way, all backup tasks may run in parallel to minimize the amount of time needed to perform the backup.

Once a number of backup tasks is determined, the division module 610 may divide the volume 302 into a number of sections corresponding to the number of backup tasks. In certain embodiments, each of these sections may be of substantially equal size. The task dispatch module 612 may then dispatch the backup tasks to back up the data in their corresponding sections. Each backup task may create a data set 304 containing data from the corresponding section. The linking module 614 may, in turn, link the data sets 304 together. This may be accomplished by inserting control information into the header of each data set 304 that indicates the association with the volume 302 or backup set, and/or creating a high-level data set that encompasses each of the individual data sets 304. In certain embodiments, this may also be accomplished by structuring each data set 304 as a member of a PDSE data set 500.

When a volume 302 needs to be restored, the restore module 616 may be invoked. The restore module 616 may dispatch multiple restore tasks to restore data to the volume 302 in parallel. A restore task may be assigned to each data set 304 and the total number of restore tasks may be equal to the number of data sets 304 in the backup set.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for backing up data, the method comprising:
identifying a volume of data to back up to a target;
determining a number of backup tasks that can execute in parallel to back up the data to the target, wherein determining the number of backup tasks comprises adjusting the number of backup tasks in accordance with a fragmentation level of the target;

dividing the volume into a number of sections corresponding to the number of backup tasks, wherein each section is associated with a particular backup task; and initiating the backup tasks to back up their corresponding sections in parallel.

2. The method of claim 1, wherein each backup task generates a data set storing backup data from its corresponding section.

3. The method of claim 2, wherein each data set contains control information linking the data sets together.

4. The method of claim 1, wherein each backup task generates a member of a Partitioned Data Set Extended (PDSE) data set.

5. The method of claim 1, wherein determining a number of backup tasks comprises adjusting the number of backup tasks in accordance with an amount of memory available.

6. The method of claim 1, wherein a higher level of fragmentation of the target results in a higher number of backup tasks.

7. The method of claim 1, wherein determining a number of backup tasks further comprises adjusting the number of backup tasks in accordance with a number of tape mounts that are available.

8. A computer program product for backing up data, the computer program product comprising a non-transitory computer-readable storage medium having computer-usable program code embodied therein, the computer-usable program code configured to perform the following when executed by at least one processor:

identify a volume of data to back up to a target;

determine a number of backup tasks that can execute in parallel to back up the data to the target, wherein determining the number of backup tasks comprises adjusting the number of backup tasks in accordance with a fragmentation level of the target;

divide the volume into a number of sections corresponding to the number of backup tasks, wherein each section is associated with a particular backup task; and initiate the backup tasks to back up their corresponding sections in parallel.

9. The computer program product of claim 8, wherein each backup task generates a data set storing backup data from its corresponding section.

10. The computer program product of claim 9, wherein each data set contains control information linking the data sets together.

11. The computer program product of claim 8, wherein each backup task generates a member of a Partitioned Data Set Extended (PDSE) data set.

12. The computer program product of claim 8, wherein determining a number of backup tasks comprises adjusting the number of backup tasks in accordance with an amount of memory available.

13. The computer program product of claim 8, wherein a higher level of fragmentation of the target results in a higher number of backup tasks.

14. The computer program product of claim 8, wherein determining a number of backup tasks further comprises adjusting the number of backup tasks in accordance with a number of tape mounts that are available.

15. A system for backing up data, the system comprising:

at least one processor;

at least one memory device operably coupled to the at least one processor and storing instructions for execution on the at least one processor, the instructions causing the at least one processor to:

identify a volume of data to back up to a target;

determine a number of backup tasks that can execute in parallel to back up the data to the target, wherein determining the number of backup tasks comprises adjusting the number of backup tasks in accordance with a fragmentation level of the target;

divide the volume into a number of sections corresponding to the number of backup tasks, wherein each section is associated with a particular backup task; and initiate the backup tasks to back up their corresponding sections in parallel.

16. The system of claim 15, wherein each backup task generates a data set storing backup data from its corresponding section.

17. The system of claim 15, wherein each backup task generates a member of a Partitioned Data Set Extended (PDSE) data set.

18. The system of claim 15, wherein determining a number of backup tasks comprises adjusting the number of backup tasks in accordance with an amount of memory available.

19. The system of claim 15, wherein a higher level of fragmentation of the target results in a higher number of backup tasks.

20. The system of claim 15, wherein determining a number of backup tasks further comprises adjusting the number of backup tasks in accordance with a number of tape mounts that are available.

\* \* \* \* \*